B. F. HART, Jr.
WATER COOLING TOWER.
APPLICATION FILED MAR. 11, 1908.
1,023,564.
Patented Apr. 16, 1912.
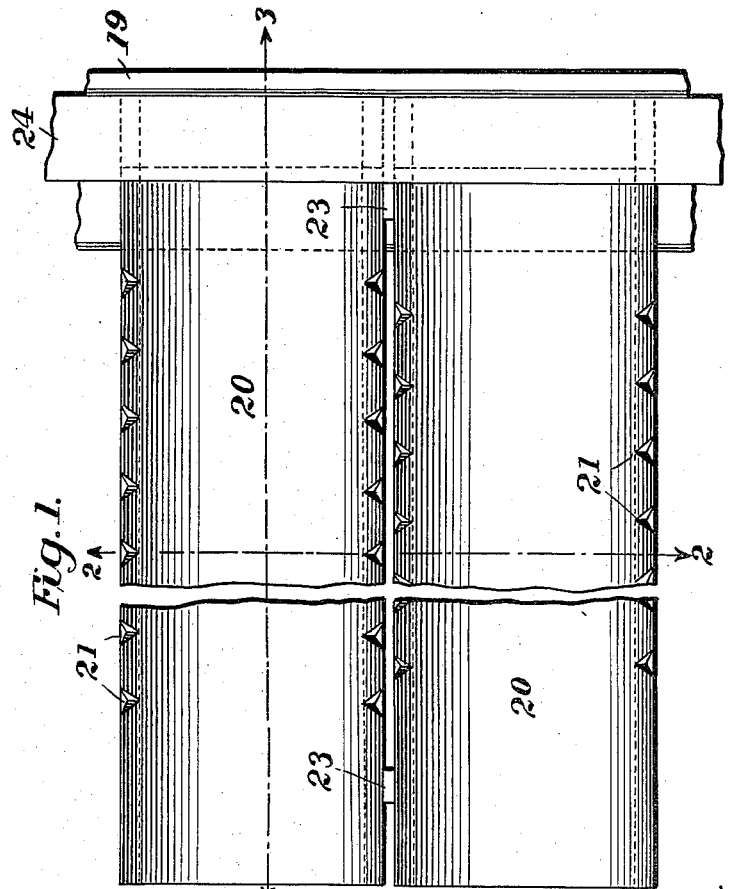
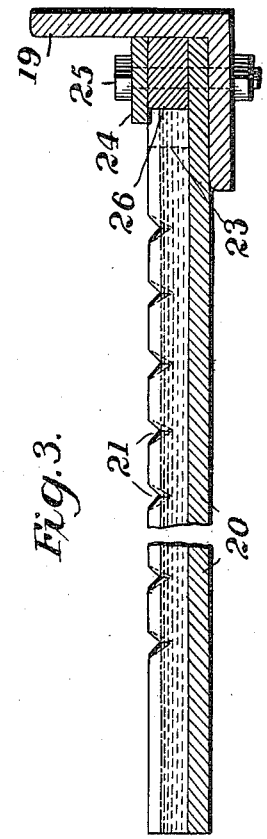
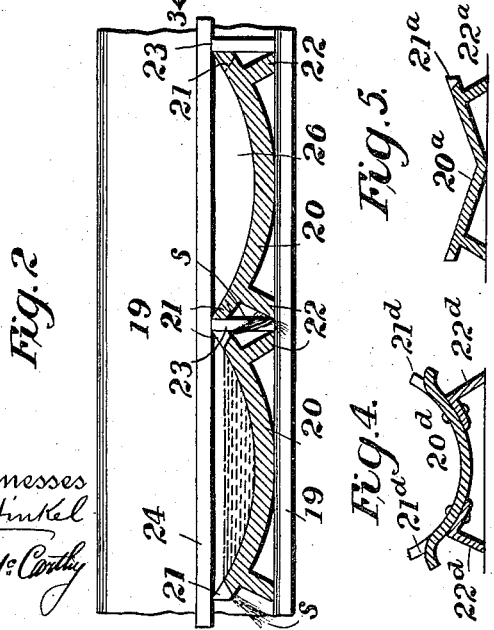
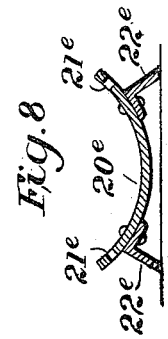

UNITED STATES PATENT OFFICE.

BENJAMIN F. HART, JR., OF HOBOKEN, NEW JERSEY.

WATER-COOLING TOWER.

1,023,564. Specification of Letters Patent. Patented Apr. 16, 1912.

Original application filed June 17, 1907, Serial No. 379,514. Divided and this application filed March 11, 1908. Serial No. 420,384.

*To all whom it may concern:*

Be it known that I, BENJAMIN F. HART, Jr., a citizen of the United States, residing at Hoboken, in the county of Hudson and State of New Jersey, have invented certain new and useful Improvements in Water-Cooling Towers, of which the following is a specification.

My invention relates to the shallow pans used in connection with towers for cooling water, as shown and described in my copending application Serial No. 379,514, filed June 17, 1907, and of which this case is a division, and whose function is to evenly distribute and shower the water in a more or less finely divided state to the action of the atmosphere for aeration and evaporation.

The object of the present invention, therefore, is to provide a construction of tray which will carry out the above stated operations in an efficient manner, and at the same time reduce the cost of manufacture and needed repairs to a minimum.

Other objects and advantages of my improved construction in detail will appear from the following description of a preferred form thereof, taken in connection with the accompanying drawings, and the same will finally be more particularly pointed out in the appended claims.

Like reference characters designate corresponding parts in each view.

Figure 1 is a plan view of one form of the trough. Fig. 2 is a section on line 2—2 of Fig. 1. Fig. 3 is a section on line 3—3 of Fig. 1. Figs. 4, 5, 6, 7 and 8 show cross sections of modified forms of troughs or trays.

In Figs. 1, 2 and 3 is illustrated a form of cooling trough, a plurality of which may be readily substituted for any of the simple and common forms of pan now used and having a perforated bottom with deflecting flutes. Referring to the above figures, 19 represents one of the end supports or outer frame sections on which are supported a series of properly separated trays or troughs 20 which may be made of cast iron, wood, galvanized iron or any other material that will not deteriorate when brought in contact with liquids. The trays or troughs 20 are preferably made of the form of a segment of a pipe or tube laid horizontally with the concave side up, thus forming shallow troughs which catch the liquid in its travel through the tower. The water in falling from one tray to the next lower causes a slight agitation of the water in the tray so as to cause the same to flow with a velocity sufficient to carry it out of the notches and form the streams s, s. Said trays or troughs 20 are notched on each edge with a V or other suitably shaped opening 21, 21 through which the liquid flows in thin streams s, s, (see Fig. 2).

22, 22 are inclined projections or ledges formed on the under sides of the trays 20 which act as baffles or diffusers against which the small streams s, s passing over the inclined bottom while flowing through the notches or openings 21 of the adjacent tray impinge at right angles to the inclined projections or supports thereby effectively dividing the liquid into fine particles for the drop to the next cooling pan. The water drops about seven feet in falling from one pan to the next lower, and in so doing spatters after landing. These spatters drop down through the openings between the troughs and as they all travel in a lateral or diagonal direction they strike the projections or ledges 22 and are collected in drops for passage to the next lower pan. It will be thus seen that this feature of separating the pans as described above is a vital one, not only for the above reason in permitting the water to be broken up into these "spatters" and then again collected into drops to pass to the next lower pan, but also permits the air currents to pass between the pans and up or down through the interior sections of the tower and more efficiently cool the water. These projections or ledges 22 also serve as feet to keep the trays in a level plane on the supports 19. The notches or openings 21 are arranged at intervals on the edges of the trays and in such a manner that the openings in adjacent trays do not come opposite but are staggered with respect to each other. The advantage of this construction and arrangement is that each tiny stream is kept separated whereby a greater air exposure is attained than if the streams impinged on each other which is the case if the lips of adjacent trays were placed opposite each other. The trays are separated from each other by spacing blocks 23, 23, near each end, (see Fig. 1), and are firmly held to their supporting frame section 19 by means of fastening strips 24 and bolts 25 passing through filler blocks 26. Said trays by being separated only a fraction of an inch, enable the streams flowing from one tray to strike the adjacent tray as above explained.

Fig. 5 represents a tray 20$^a$ of V-shaped cross section having overflow notches or openings 21$^a$ and combined baffles and supports 22$^a$.

Figs. 6 and 7 show trays 20$^b$ and 20$^c$ respectively semi-circular and rectangular in cross section which have corresponding overflow notches 21$^b$ and 21$^c$ and supports 22$^b$ and 22$^c$.

Figs. 4 and 8 show trays which are built up from sheet metal and having the supports separate and riveted on bottom of trays. In Fig. 4 the openings 21$^d$ are formed by slitting the upper edges of the trays and bending down the alternate portions between the slits forming overflow lips. In Fig. 8 openings 21$^e$ are formed in the sheet metal at proper intervals. These two last forms enable me to make a light yet durable form of tray.

Instead of having the overflow openings made by slits as shown in Fig. 4, the openings of Fig. 8 may be partially punched out and the punched out section made to extend outwardly and form an overflow lip similar to that shown in Fig. 4.

While I have shown and described several forms of this invention, it will be readily understood that many other forms can be evolved and will readily suggest themselves and be within the scope of my present invention.

Having now fully described my invention, what I claim as new and desire to secure by Letters Patent, is as follows:—

1. A deck for cooling towers comprising a plurality of slightly separated trays or troughs having means for allowing the water to flow from and between the trays in separate and independent streams, and inclined combined supports and diffusers on the underside of said trays or troughs, the support of one tray receiving substantially at right angles the impingement of the water from the adjacent tray.

2. A deck for cooling towers comprising a plurality of slightly separated trays or troughs having their adjacent sides provided with staggered overflow openings, and inclined combined supports and diffusers on the underside of said trays or troughs, the support of one tray receiving substantially at right angles the impingement of the water from the adjacent tray.

3. A deck for cooling towers comprising a plurality of slightly separated trays or troughs, means on the adjacent sides of the trays to sub-divide the overflowing water between the trays into separate and independent streams, and inclined supporting ledges or projections on the underside of the trays or troughs against which impinge at right angles the streams of water from the adjacent tray.

In testimony whereof I affix my signature in presence of two witnesses.

BENJAMIN F. HART, Jr.

Witnesses:
G. A. LEWES,
WILLIAM H. WHITE.

Copies of this patent may be obtained for five cents each, by addressing the "Commissioner of Patents, Washington, D. C."